United States Patent [19]

Decky et al.

[11] 4,192,477
[45] Mar. 11, 1980

[54] PIPE-WALL STUD CONNECTOR

[76] Inventors: John R. Decky, 1291 SE. 5th Ave., Pompano Beach, Fla. 33060; Bruno P. Meyer, 560 NE. 44th St., Boca Raton, Fla. 33432

[21] Appl. No.: 927,486

[22] Filed: Jul. 24, 1978

[51] Int. Cl.² ............................................. F16L 5/00
[52] U.S. Cl. .................................. 248/56; 248/27.1; 285/48; 285/162; 285/178; 285/423; 285/DIG. 22; 16/2
[58] Field of Search .................. 16/2; 285/178, 162, 285/48, 338, 196, 158, 423, DIG. 22; 248/56, 27.1; 174/152 G, 153 G, 65 G

[56] References Cited

U.S. PATENT DOCUMENTS

| 3,006,443 | 10/1961 | Siler | 285/178 |
| 3,333,501 | 8/1967 | Pitcher | 285/178 X |
| 3,562,847 | 2/1971 | Jemison | 16/2 |

FOREIGN PATENT DOCUMENTS 275410  1/1966  Australia ........................................ 16/2

*Primary Examiner*—Dave W. Arola
*Attorney, Agent, or Firm*—Joseph Zallen

[57] ABSTRACT

A mounting insulator for securing a pipe, conduit, or tube through a metal wall stud or other thin planar surface to reduce the noise of water hammer and dialectic interaction between the pipe and the wall stud, the device including an off-center pipe receiving passage which allows for adjustable positioning of a pipe axis relative to the stud aperture axis.

The device is comprised of a substantially annular, somewhat flexible ring having a radial slot allowing the annular body to be spread apart and an interior circular passage, the central axis of which is offset relative to the axis of the annular ring. The circular passage includes a flexible wall portion which allows for a snug fit when a pipe is received therein. The device further includes a raised peripheral barrier and a plurality of flanges which cooperate to allow the device to be locked tightly in an aperture in a metal wall stud. The device is mounted about a pipe by spreading the annular body at the radial slot, and then inserted in the stud aperture. Precise alignment of the pipe through a stud aperture is achieved by rotating the device which changes the position of the circular pipe receiving passage around the central axis of the ring allowing for positioning adjustment of the pipe relative to the stud aperture. The device can be installed on a pipe already disposed through the stud aperture.

1 Claim, 3 Drawing Figures

PIPE-WALL STUD CONNECTOR

BACKGROUND OF THE INVENTION

This invention relates generally to an insulator which is used to mount a pipe through a thin planar surface such as a metal wall stud or the like which is found conventionally in the interior and exterior walls of a building or other similar structure, and specifically to a flexible pipe-stud insulator which is used to support the pipe through the stud, allowing for precise adjustment of the pipe axis relative to the stud aperture and a great reduction in water hammer noise or dialectic interaction between the pipe and the stud.

Plastic annular supports for mounting electrical wires in wall studs are known in the prior art. Essentially they are comprised of annular rings having a central passage for receiving the electrical wires. The central passage has a fixed continuous wall that requires that the conduit be threaded through the passage. With respect to water pipes or similar rigid conduits mounted within a metal stud, no device is known in the prior art.

The present invention overcomes the deficiencies found in the prior art by providing a readily mounted pipestud support and insulator which is manually locked within an aperture in a wall stud and which allows for offset adjustment of the pipe axis relative to the stud aperture axis. Further, the device securely holds the pipe in place while greatly reducing water hammer noise.

BRIEF DESCRIPTION OF THE INVENTION

An insulator for mounting a pipe or metal tube through a metal wall stud or the like comprising a substantially annular, flexible body having a radial slot disposed through the annular body wall, and an interior wall forming a pipe encircling passage, the central axis of which is offset relative to the central axis of the annular body, the circular passage wall having an opening into the radial slot through the annular body. The interior passage is formed by an arcuate wall integrally molded within the annular body and is sized to fit snuggly around the circumference of a pipe or metal tube.

A raised, stud engaging barrier and a plurality of flanges spaced longitudinal from the barrier (approximately the thickness of the stud) are disposed on peripheral portions of the annular body which are used to act as a retaining means for holding the device within the wall stud to prevent its unintentional removal from the stud itself. The flanges are resilient and deform when the device is being inserted into the stud aperture to hold the device within the wall stud on both sides.

The radial slot through the annular body to the interior offset passage allows the body to be spread apart so that the interior offset passage can be engaged around the pipe to be secured. An additional groove may be employed on the annular body diametrically opposite the slot to aid in allowing the annular body to be spread apart. The device is normally installed on a pipe already disposed through the wall stud aperture.

Alignment of the longitudinal axis of the pipe is achieved by the capability of the device to be rotated relative to and inserted in the stud aperture such that the circular interior passage which engages the periphery of a pipe, conduit, or tube can be positioned at one of numerable locations around the overall interior aperture of the stud, providing for essentially a locus of positions available within the wall stud aperture itself. The annular body may include interior rib-like members (in lieu of being solid) for increased support strength around the interior passage wall. The device prevents the pipe from striking the stud and absorbs and dampens vibration in the pipe. The resilient material of the device creates a circumferential compression force that secures the pipe firmly to the wall stud. The compression force can be enhanced by having the diameter of the annular body slightly larger than the stud aperture requiring manual circumferential compression by pushing the slot walls together during insertion.

In normal operation, the device is mounted on a pipe or metal tube already disposed through an aperture in the stud. The device is positioned around the pipe by spreading the slot walls of the annular body apart and engaging the interior circular passage around the pipe circumference. The device is then rotated (if necessary) to properly align the longitudinal axis of the pipe in a desired position relative to the stud aperture. After the desired alignment is achieved, the device is pushed partially through the stud aperture until the raised barrier and locking flanges are engaged on opposite sides of the stud.

It is an object of this invention to provide an improved pipe, conduit, or metal tube insulator that is readily mounted about a pipe for securing a conduit or pipe through a wall stud or other planar surface to prevent water hammer vibrational noise and movement and dialectic interaction between the pipe and the wall stud.

It is another object of this invention to provide a pipe insulator used within a wall stud which has an offset adjustment feature allowing the pipe axis to be precisely positioned in the desired location relative to the wall stud aperture.

In accordance with these and other objects which will be apparent hereinafter, the instant invention will now be described with particular reference to the accompanying drawings.

PREFERRED EMBODIMENT OF THE INVENTION

Figure 1:
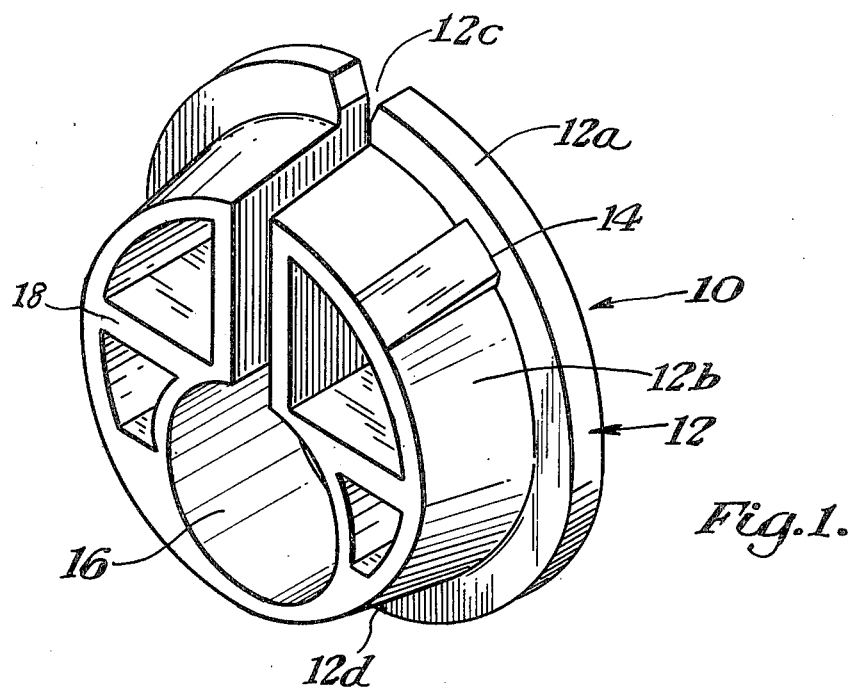
FIG. 1 shows a perspective view of the instant invention.
Figure 2:
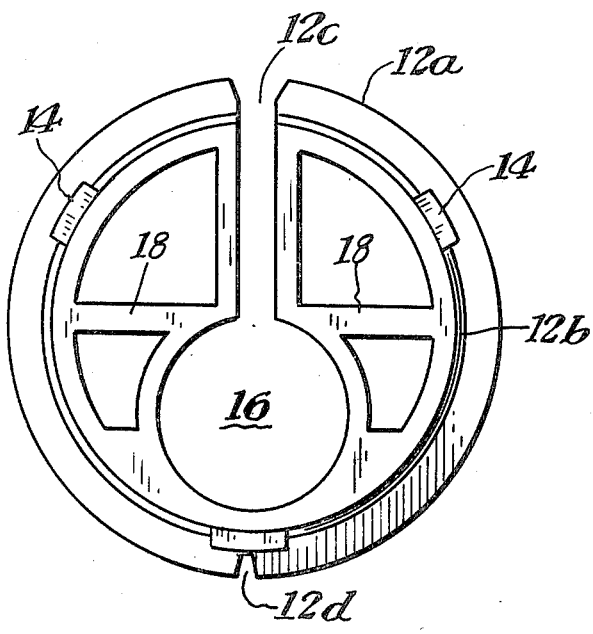
FIG. 2 shows a front elevational view of the instant invention.
Figure 3:
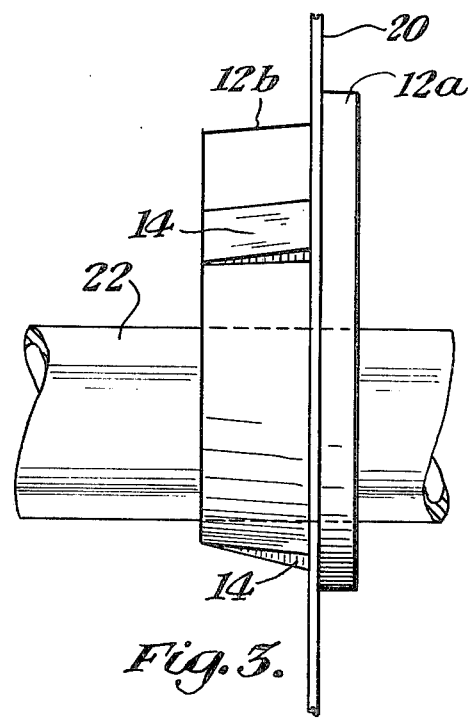
FIG. 3 shows a side elevational view of the instant invention mounted through a wall stud.

Referring now to the drawings and especially FIGS. 1 and 2, the instant invention is shown generally at 10 comprised of a substantially annular body 12 having a radially circumferentially raised barrier wall 12a joined integrally with body wall 12b. Circumferentially spaced flanges 14 act to lock the device in the aperture of a wall stud. Tapered wall 12b diameter at its largest position is sized to fit firmly in the stud aperture. The device includes a slot 12c formed between the ends of the annular body and rib-like members which form interior radial walls which terminate in a circular passage 16 that engages the conduit or pipe. The central axis of the circular passage 16 is offset from the central axis of the annular body 12 so that rotation about the central axis of the annular body 12 positions the circular passage 16 at various positions within the aperture of the wall stud. A notch 12d in the annular body opposite the slot 12c may be employed to aid in allowing the body 12 to be manually spread and held apart (enlarging the slot width) for engaging the device around the pipe to be mounted. FIG. 3 shows the device installed in a conventional metal wall stud 20, the device being locked in place by the cooperation between raised barrier wall 12a and flanges 14, the wall 12a and flanges 14 being spaced apart sufficiently to accommodate the thickness of the stud 20. A pipe 22 is secured within the central offset passage. The top surface of each flange 14 slopes upwardly approaching the barrier wall 12a to aid in the insertion of the device in the stud aperture.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An insulating device for securing and supporting a pipe, conduit or tube through an aperture in a metal wall stud or other thin planar surface comprising:

an annular flexible body having a radially circumferentially raised barrier wall (12a) joined integrally with tapered body wall (12b); said tapered wall (12b) diameter being largest at the junction with said barrier wall and thereat sized to fit firmly in such stud aperture; said tapered wall (12b) joining with ribs (18) an inner wall to form a circular pipe-engaging passage (16) and radial slot opening (12c); said barrier wall (12a) having an opening registering with said radial slot opening (12c); the central axis of said passage (16) being offset from the central axis of said tapered body wall (12b); said tapered body wall (12b) having resilient locking means (14) spaced from and cooperable with said barrier wall (12a) for engaging the thickness of a stud (20); said device being characterized in that it can be rotated to properly align the longitudinal axis of a pipe in a desired position relative to the stud aperture and can be mounted transversely by way of said slot and opening on a pipe which is already disposed through an aperture in the stud.

* * * * *